(12) United States Patent
Wang et al.

(10) Patent No.: US 7,533,524 B2
(45) Date of Patent: May 19, 2009

(54) METHOD AND APPARATUS FOR SOOT FILTER CATALYST TEMPERATURE CONTROL WITH OXYGEN FLOW CONSTRAINT

(75) Inventors: Yue Yun Wang, Columbus, IN (US); Wole C. Akinyemi, Columbus, IN (US)

(73) Assignee: Cummins Inc., Columbus, IN (US)

( * ) Notice: Subject to any disclaimer, the term of this patent is extended or adjusted under 35 U.S.C. 154(b) by 574 days.

(21) Appl. No.: 11/131,571

(22) Filed: May 18, 2005

(65) Prior Publication Data
US 2006/0260299 A1    Nov. 23, 2006

(51) Int. Cl.
F01N 3/00    (2006.01)

(52) U.S. Cl. .............. 60/297; 60/274; 60/286; 60/295; 60/303; 60/311; 703/7; 703/8

(58) Field of Classification Search .......... 60/274, 60/277, 278, 280, 286, 295, 297, 299, 300, 60/303, 311; 703/7, 8
See application file for complete search history.

(56) References Cited

U.S. PATENT DOCUMENTS

| | | | |
|---|---|---|---|
| 4,752,361 A | 6/1988 | Gautschi | |
| 4,887,426 A | 12/1989 | Goerlich | |
| 5,067,973 A | 11/1991 | Pattas | |
| 5,081,836 A | 1/1992 | Smith et al. | |
| 6,516,611 B1 | 2/2003 | Schafer-Sindlinger et al. | |
| 6,574,956 B1 | 6/2003 | Moraal et al. | |
| 6,598,388 B2 | 7/2003 | Lucas et al. | |
| 6,694,727 B1 | 2/2004 | Crawley et al. | |
| 6,745,560 B2 | 6/2004 | Stroia et al. | |
| 6,769,245 B2 | 8/2004 | Itoh et al. | |
| 6,779,339 B1 * | 8/2004 | Laroo et al. | 60/297 |
| 6,829,890 B2 * | 12/2004 | Gui et al. | 60/295 |
| 6,857,265 B2 | 2/2005 | Twigg et al. | |
| 7,086,220 B2 * | 8/2006 | Imai et al. | 60/274 |
| 7,111,455 B2 * | 9/2006 | Okugawa et al. | 60/295 |
| 7,143,578 B2 * | 12/2006 | Kakwani et al. | 60/286 |
| 7,210,285 B2 * | 5/2007 | Sato et al. | 60/295 |
| 7,337,607 B2 * | 3/2008 | Hou et al. | 60/274 |
| 2003/0115859 A1 | 6/2003 | Deeba | |
| 2003/0200745 A1 | 10/2003 | van Nieuwstadt et al. | |
| 2004/0040290 A1 | 3/2004 | Crawley et al. | |
| 2004/0040292 A1 | 3/2004 | Odendall | |
| 2004/0055282 A1 | 3/2004 | Gray, Jr. et al. | |
| 2004/0098981 A1 | 5/2004 | Crawley et al. | |

FOREIGN PATENT DOCUMENTS

WO    WO 2005/005797    *    1/2005    ............ 60/295

* cited by examiner

*Primary Examiner*—Binh Q Tran
(74) *Attorney, Agent, or Firm*—J. Bruce Schelkopf; Krieg DeVault LLP (57) ABSTRACT

A system and method for controlling soot regeneration in a catalyst soot filter ("CSF") of an exhaust system for a diesel engine by measuring the inlet temperature of a diesel oxidation catalyst ("DOC") coupled to the CSF, determining a target light off temperature for the DOC, injecting a first fuel amount into a cylinder of the engine to cause the DOC inlet temperature to approach the target light off temperature, measuring the CSF inlet temperature and pressure across the CSF, determining a target CSF inlet temperature for regeneration, injecting a second fuel amount for combustion in the DOC to cause the CSF inlet temperature to approach the target CSF inlet temperature.

27 Claims, 7 Drawing Sheets

METHOD AND APPARATUS FOR SOOT FILTER CATALYST TEMPERATURE CONTROL WITH OXYGEN FLOW CONSTRAINT

FIELD OF THE INVENTION

The present invention generally relates to controlling regeneration of catalyst soot filters, and more particularly to methods and systems for controlling fuel injections to produce temperature and oxygen conditions needed for efficient soot regeneration.

BACKGROUND OF THE INVENTION

Internal combustion engines generate particle emissions that are undesirable for a variety of reasons. It is well known that waste products in engine exhaust such as carbon monoxide, hydrocarbons, and nitrogen oxides adversely affect human health, and present risks to the environment. Diesel engines in particular produce considerable amounts of soot, which contains particulate matter, black carbon, sulfur dioxide, nitrogen oxides and other hazardous pollutants. Several government agencies regulate emissions of such material.

To meet these regulations, conventional diesel exhaust systems include catalyst soot filters to collect the soot resulting from fuel combustion, and reduce the amount of soot that exits the tailpipe. Such soot filters typically include aluminum-oxide coated meshes, ceramic fibers, ceramic honeycomb structures or ceramic foams. Over time, soot filters become clogged, and must be regenerated. Generally, the regeneration process includes burning the accumulated soot to convert it into less harmful material. One method for accomplishing periodic regeneration is to allow the soot filter to become clogged with soot and accumulate heat due to increased engine speed or load. Eventually, the heat increases to the temperature required for ignition of the carbon constituent of the soot (typically 550 to 600 degrees C.). Under certain load conditions, however, the exhaust gas temperatures do not reach these levels.

SUMMARY OF THE INVENTION

In one embodiment, the present invention provides a method for controlling soot regeneration in a catalyst soot filter ("CSF") of an exhaust system for a diesel engine, including the steps of measuring the gas temperature at the inlet to a diesel oxidation catalyst ("DOC") coupled to the CSF, determining a target light off temperature for the DOC based on a measurement of exhaust flow through the exhaust system, injecting a first fuel amount, derived from the difference between the measured DOC inlet temperature and the target light off temperature, into a cylinder of the engine to cause the measured DOC inlet temperature to approach the target light off temperature, measuring the gas temperature at the inlet of the CSF and the pressure across the CSF, determining a target CSF inlet temperature for regeneration based on the exhaust flow measurement and the measured pressure, and injecting a second fuel amount, derived from the difference between the measured CSF inlet temperature and the target CSF inlet temperature, for combustion in the DOC to cause the measured CSF inlet temperature to approach the target CSF inlet temperature.

The above mentioned and other features of this invention, and the manner of attaining them, will become more apparent and the invention itself will be better understood by reference to the following description of embodiments of the invention taken in conjunction with the accompanying drawings.

The above mentioned and other features of this invention, and the manner of attaining them, will become more apparent and the invention itself will be better understood by reference to the following description of embodiments of the invention taken in conjunction with the accompanying drawings.

DETAILED DESCRIPTION OF EMBODIMENTS OF THE INVENTION

The embodiments disclosed below are not intended to be exhaustive or to limit the invention to the precise forms disclosed in the following detailed description. Rather, the embodiments are chosen and described so that others skilled in the art may utilize their teachings.

Figure 1:
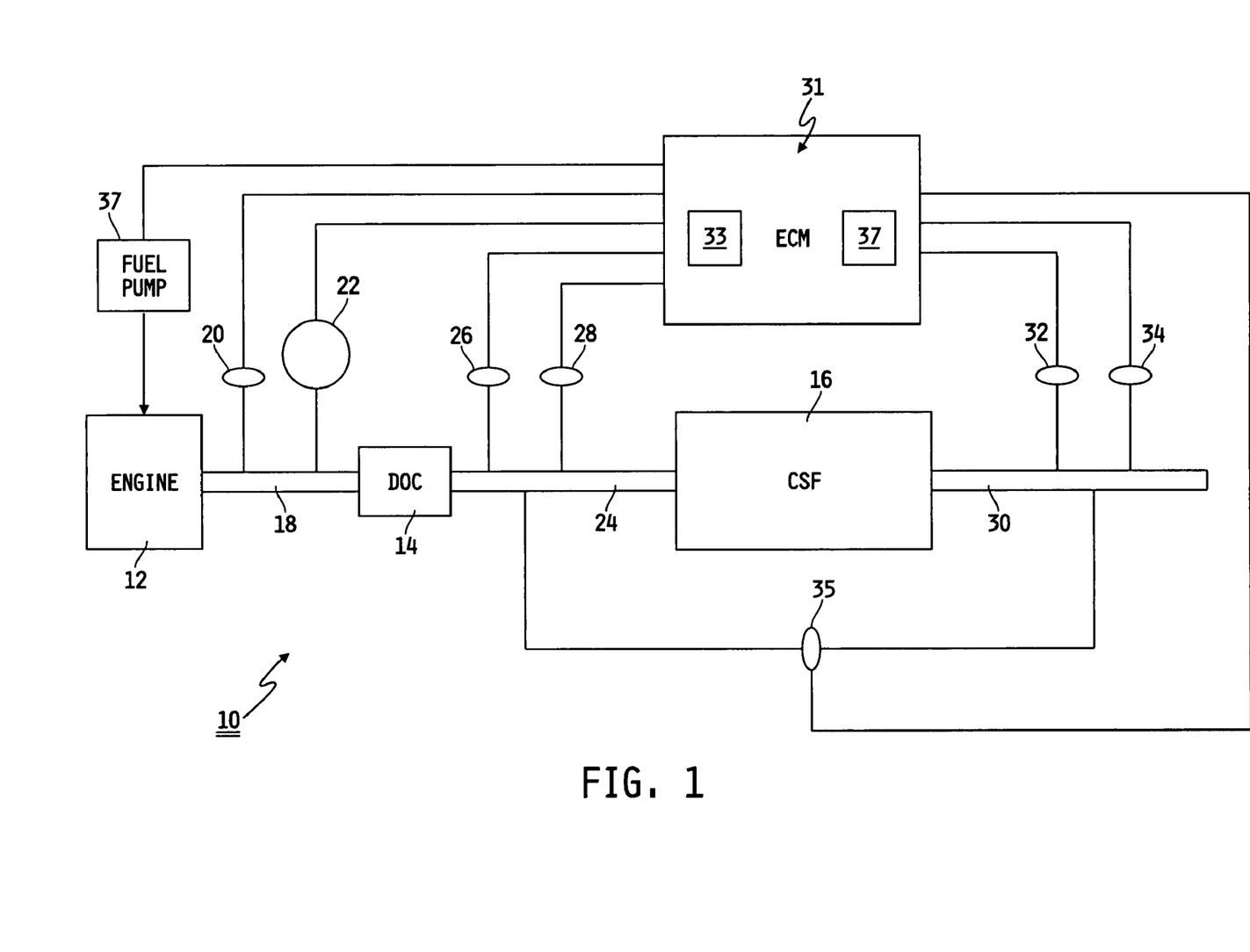
FIG. 1 is a conceptual block diagram of a hardware configuration for use principles of the present invention.

FIG. 1 depicts a hardware configuration for use with one embodiment of a method according to the present invention. As shown, the system 10 generally includes an engine 12, a diesel oxidation catalyst ("DOC") 14, and a catalyst soot filter ("CSF") 16. Exhaust gas including unburned hydrocarbons ("UHCs") is routed to DOC 14 via a conduit 18. Coupled to conduit 18 is a temperature sensor 20 for detecting the temperature of the exhaust gas and generating a signal representative of the exhaust gas temperature ("the T1 signal"). Also coupled to conduit 18 is a fuel doser 22, which is configured to inject fuel into conduit 18 in accordance with certain command signals as is further described below. At the output of DOC 14 is another conduit 24 for routing the gas output of DOC 14 to CSF 16. A second temperature sensor 26 is coupled to conduit 24 to detect the temperature of the CSF inlet gas and generate a signal representative of the temperature of the CSF inlet gas ("the T2 signal"). An oxygen sensor 28 is also coupled to conduit 24 to detect the percentage of oxygen contained in the CSF inlet gas and generate a signal representative of the oxygen percentage ("the $O2_{IN}$ signal"). A third conduit 30 routes the gas output by CSF 16 to atmosphere. A third temperature sensor 32 is coupled to conduit 30 to detect the temperature of the CSF outlet gas and generate a signal representative of the CSF outlet gas ("the T3 signal"). As is further described below, in one embodiment of the invention, a second oxygen sensor 34 is coupled to conduit 30 to detect the percentage of oxygen in the gas at the outlet of CSF 16, and generate a signal representative of the oxygen percentage of the CSF outlet gas (the "$O2_{OUT}$ signal"). A pressure sensor 35 is coupled to both conduit 24 and conduit 30 to detect the differential between the pressure of the CSF inlet gas and the pressure of the CSF outlet gas, and generate a signal representative of that pressure differential ("the DP signal"). As shown, each of sensors 20, 22, 26, 28, 32, 34 and 35 are electrically connected to an Engine Control Module ("ECM") 31, which includes a microprocessor 33 and an associated memory 37. Additionally, a fuel pump 39 is coupled to engine 12 to provide fuel to engine 12 according to fueling command signals from ECM 31.

Figure 2:
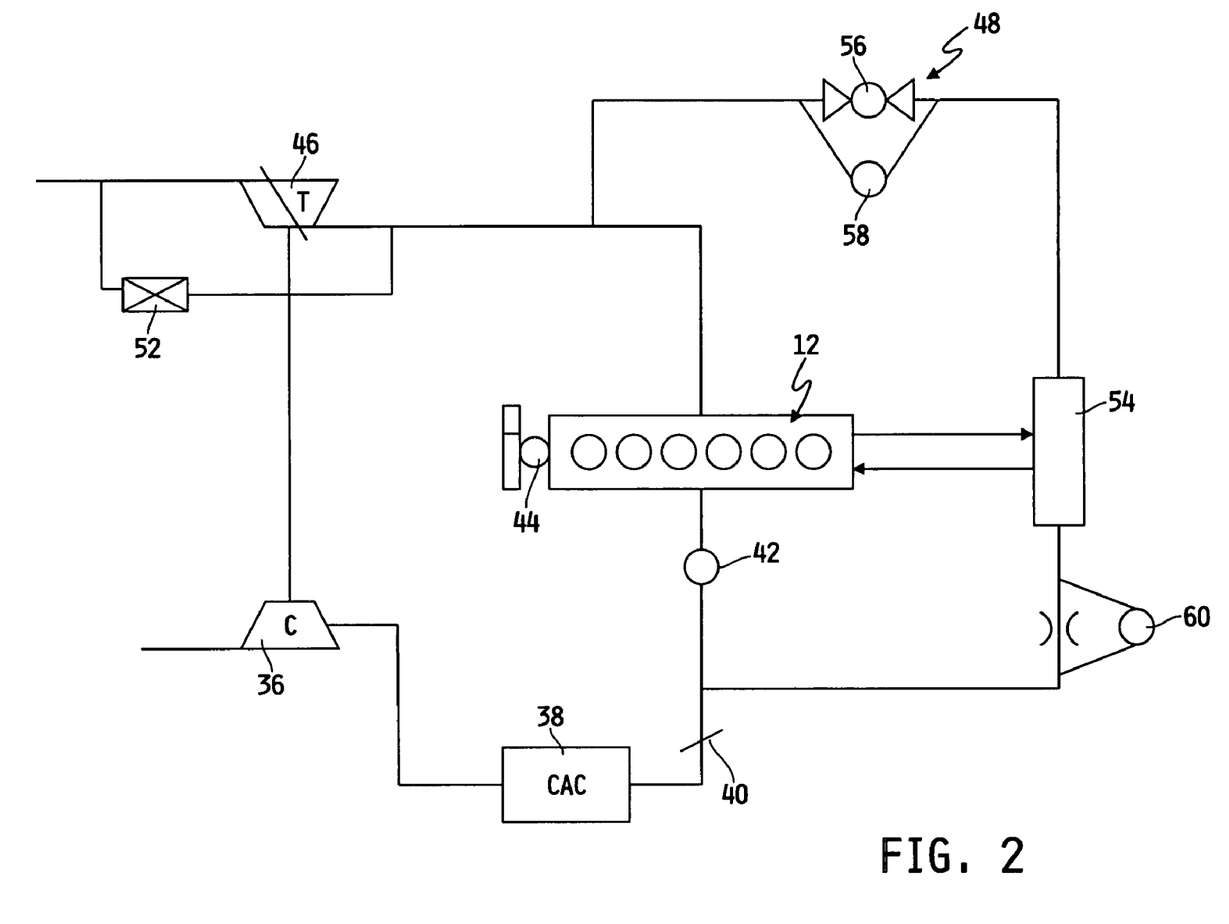
FIG. 2 is another conceptual block diagram of components of a conventional after-treatment system.

FIG. 2 depicts various components that may be included in an engine with an after-treatment system. In general, fresh air is routed from a compressor 36 to a charge air cooler ("CAC") 38, which provides a charge flow of air through an adjustable intake air throttle 40. The charge flow of air is combined with an exhaust gas recirculation ("EGR") flow, as is further described below, and provided to engine 12. A pressure sensor 42 is configured to sense the pressure of the engine intake manifold. A speed sensor 44 is coupled to engine 12 to determine the speed of operation of engine 12. A portion of the exhaust from engine 12 is routed to a variable geometry turbine 46, and a portion is routed to an EGR valve 48. The exhaust routed to turbine 46 is used to generate air flow from compressor 36 according to principles that are well known in the art. A normally closed exhaust waste gate 52 is connected across the exhaust inlet and the outlet of turbine 46. If the pressure at the exhaust inlet exceeds a predetermined value, gate 52 opens to vent the excess pressure to atmosphere.

ERG valve 48 is a variable position valve that controls the flow of exhaust gas to an ERG cooler 54. The position of ERG valve 48 is sensed by position sensor 56, and the pressure differential across ERG valve 48 is detected by a pressure sensor 58. ERG cooler 54 provides recirculated exhaust gas to engine 12. An ERG orifice delta pressure sensor 60 is coupled to the output of ERG cooler 54. As is further described below, during operation of engine 12, pressure sensor 42 provides ECM 31 a signal representing the pressure of the engine intake manifold ("the intake manifold pressure signal"), speed sensor 44 provides ECM 31 a signal representing the speed of operation of engine 12 ("the RPM signal"), position sensor 56 provides ECM 31 a signal representing the position of EGR valve 48 ("the EGR position signal"), pressure sensor 58 provides ECM 31 a signal representing the pressure differential across EGR valve 48 ("the EGR pressure signal"), and EGR orifice delta pressure sensor 60 provides ECM 31 a signal representing the estimated EGR flow ("the EGR flow signal"). Several of these signals are used by microprocessor 33 as inputs to look-up tables stored in memory 37 to control operation of engine 12 under different operating conditions. For purposes of controlling air intake throttle 40 and adjusting the amount and timing of fuel injected into engine 12 by fuel pump 39 (FIG. 1) during regeneration of CSF 16, microprocessor 33 uses the RPM signal and provides fueling command signals to fuel pump 39. In one table, the RPM signal and the fueling command signal are mapped to a mass air command for regeneration. The mass air command is used by microprocessor 33 to adjust the position of air intake throttle 40, for example, to reduce the air flow to engine 12 and create a richer air/fuel mixture. The RPM signal and the fueling signal are mapped in different tables to fuel event signals which are used by microprocessor 33 to control the fuel quantity associated with a plurality of fuel injection events, as well as the injection timing during each cycle of engine 12 (based on the position of the crankshaft) during regeneration as is further described below.

Figures 3, 4:
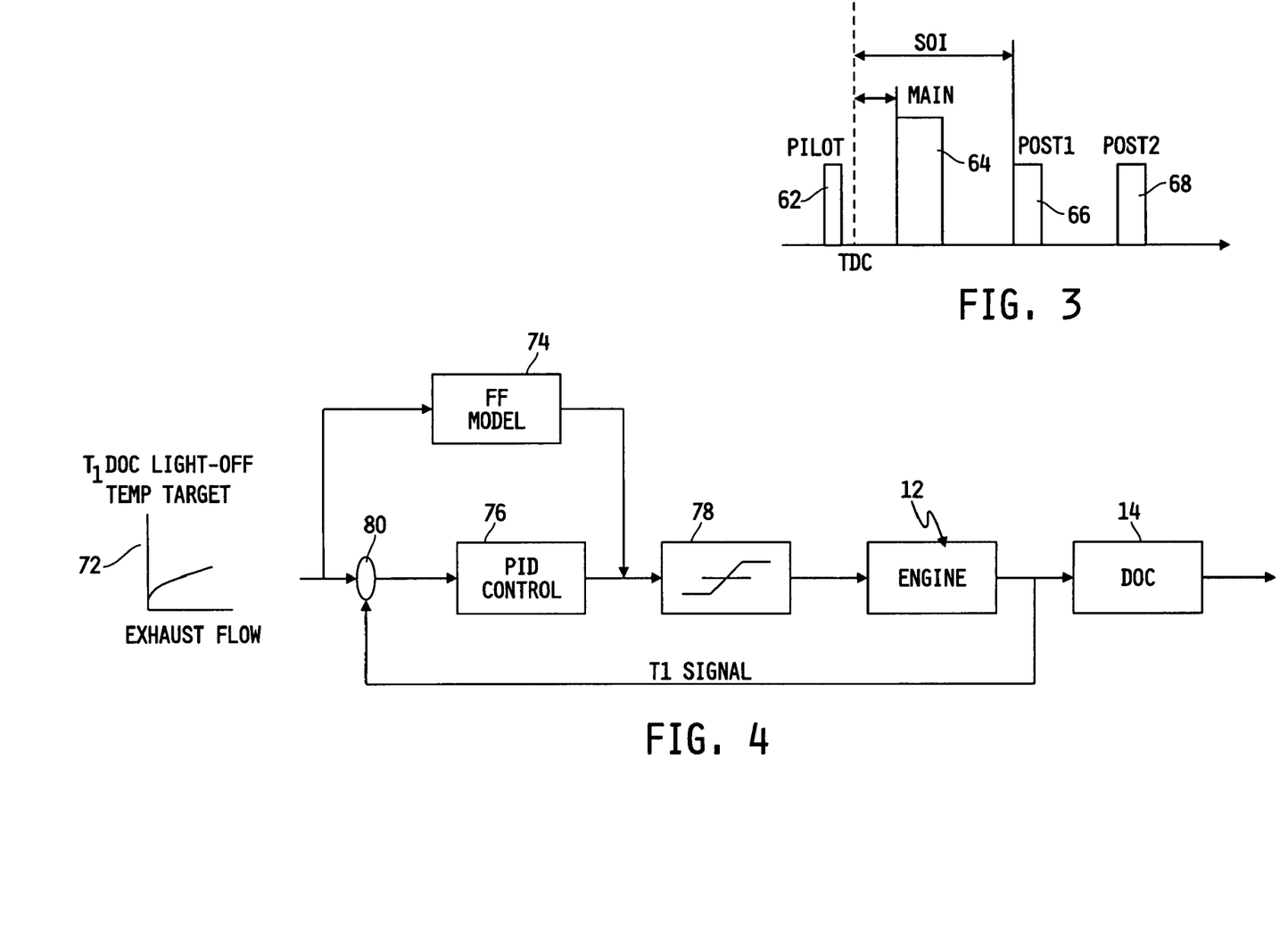
FIG. 3 is a chart depicting fuel injection events that occur during a cycle of a diesel engine.
FIGS. 4 through 8 are block diagrams of a control system according to various embodiments of the present invention.

FIG. 3 depicts various fuel injection events that occur during a cycle of engine 12. At event 62, a relatively small quantity of fuel is injected into a cylinder before the corresponding piston reaches the top dead center ("TDC") position. At some period of time after the piston reaches the TDC position, another main fuel injection event 64 occurs. The primary purpose for event 64 is to provide engine 12 with power during the subsequent stroke. At some period of time after event 64, generally denoted the start of injection ("SOI") time (in some engines, approximately 30 degrees after the piston reaches the TDC position), another fuel event ("Post 1") 66 occurs, wherein additional fuel is injected into the cylinder primarily to raise the exhaust temperature at conduit 18, without significantly affecting engine power or torque, which can be balanced by variable geometry control. As is further described below, the exhaust temperature is raised to reach the light off temperature of DOC 14 (i.e., the temperature at which DOC 14 can burn unburned fuel from doser 22). Finally, another fuel injection event ("Post 2") 68 occurs wherein additional fuel is injected into the cylinder. Post 2 event 68 increases the richness of the fuel mix, thereby further increasing UHCs at the inlet of CSF 16, which burn in DOC 14 and further increase the temperature at the inlet of CSF 16. In some engines, Post 2 event 68 begins at approximately 70 degrees after the piston reaches the TDC position. The timing of each of main event 64, Post 1 event 66 and Post 2 event 68 is determined by microprocessor 33 using the RPM signal and the fuel command signal and the tables stored in memory 37. The quantity of fuel associated with these events is determined according to the control loops described below.

FIG. 4 depicts one embodiment of a system for controlling the amount of fuel injected into engine 12 to ensure the temperature of exhaust in conduit 18 reaches the light off temperature of DOC 14. Memory 37 associated with microprocessor 33 of engine control module 31 includes data representing the relationship between the exhaust flow from engine 12 and the target DOC 14 light off temperature. Curve 72 represents the manner in which DOC 14 light off temperature is a function of exhaust flow. In general, the control system includes a feed-forward ("FF") model 74, a proportional-integral-derivative ("PID") controller 76, a fuel injection limiter 78, and a comparator 80. As shown, a target DOC 14 light off temperature is provided, based on curve 72, to comparator 80 and FF model 74. FF model 74 calculates an amount of post injection fuel needed to raise the T1 signal from temperature sensor 20 to the target DOC 14 light off temperature. Comparator 80 compares the temperature corresponding to the T1 signal to the target DOC 14 light off temperature, and provides a difference signal to PID controller 76. PID controller 76 generates an error signal based on the difference signal which adds to the post injection fuel calculated by FF model 74. This combined fuel injection value is compared to predetermined limits at fuel injection limiter 78 to prevent excessive fuel injection into engine 12. If the combined fuel injection value exceeds the limits of fuel injection limiter 78, then fuel injection limiter 78 chops the combined fuel injection value at the appropriate limit. As such, a post fuel injection command signal is output from fuel injection limiter 78 and provided to the fuel pump 39 of engine 12 to generate Post 1 event 66. The combustion of additional fuel increases the temperature at conduit 18. This temperature is sensed by temperature sensor 20, which provides the T1 signal as feedback to comparator 80. Accordingly, if the T1 signal indicates a temperature that is below the target DOC 14 light off temperature, then additional post injection fuel is injected at Post 1 event 66 to raise the temperature. Similarly, if the T1 signal indicates a temperature that is above the target DOC 14 light off temperature, then less post injection fuel is injected at Post 1 event 66 to lower the temperature.

Figure 5:
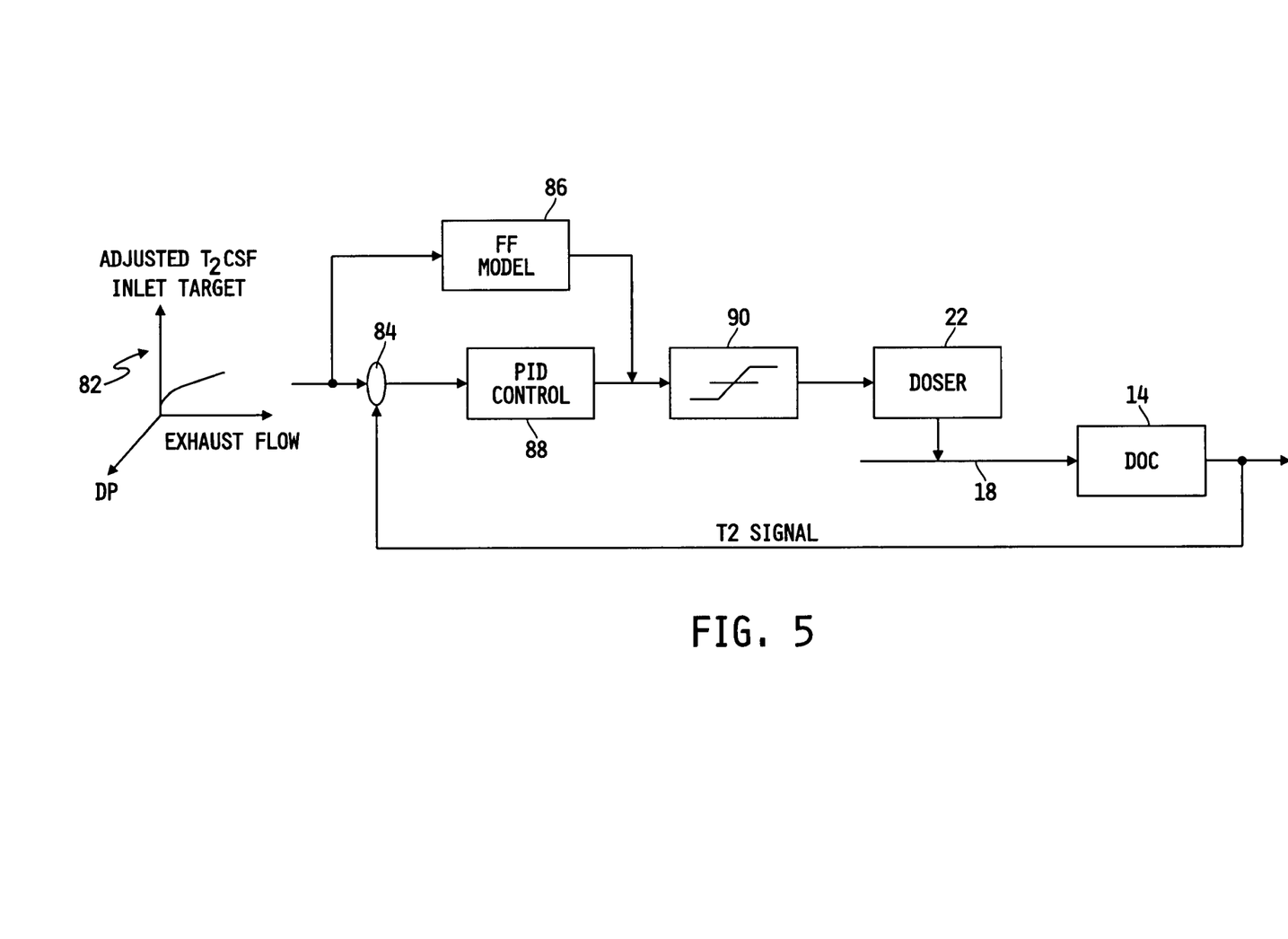

Referring now to FIG. 5, memory 37 may also include data representing the relationship between exhaust flow from engine 12, the target inlet temperature of CSF 16 for regeneration, and the pressure across CSF 16, which varies as soot accumulates in CSF 16. This three dimensional relationship is suggested by curve 82 of FIG. 5. Microprocessor 33 uses data received from engine 12 representing the exhaust flow and the DP signal received from pressure sensor 35 to derive the target inlet temperature of CSF 16. The target inlet temperature of CSF 16 is, in this embodiment, provided to a comparator 84 and a FF model 86, which calculates the amount of post injection fuel needed to maintain the actual inlet temperature of CSF 16 at a temperature suitable for regeneration (e.g., approximately 550 to 600 degrees C.). As shown in the figure, that actual temperature at the inlet of CSF 16 (the T2 signal) is provided from temperature sensor 26 as feedback to comparator 84. Comparator 84 determines the difference between the T2 signal and the target inlet temperature of CSF 16, and provides a difference signal to a PID controller 88. PID controller 88 generates an error signal based on the difference signal which adds to the post injection fuel calculated by FF model 86. This combined fuel injection value is compared to predetermined limits at fuel injection limiter 90 in the manner described above with reference to FIG. 4. In this embodiment, the post injection command signal provided by post injection limiter 90 is provided to fuel doser 22, which injects fuel into conduit 18 at the input to DOC 14. DOC 14 burns this additional fuel, thereby resulting in a higher temperature at the input of CSF 16. The higher temperature is sensed by temperature sensor 26, which provides the T2 signal back to comparator 84. In this manner, the control system depicted in FIG. 5 continuously maintains the T2 signal at approximately the target inlet temperature of CSF 16 during regeneration. It should be understood that the post injection command signal provided by post injection limiter 90 may be provided to drive fuel pump 39 to generate Post 2 event 68 instead of fuel doser 22. In such an embodiment, fuel pump 39 would inject fuel into engine 12 at Post 2 event 68 in an amount corresponding to the post injection command signal in the manner described above with reference to FIG. 5.

Figure 6:
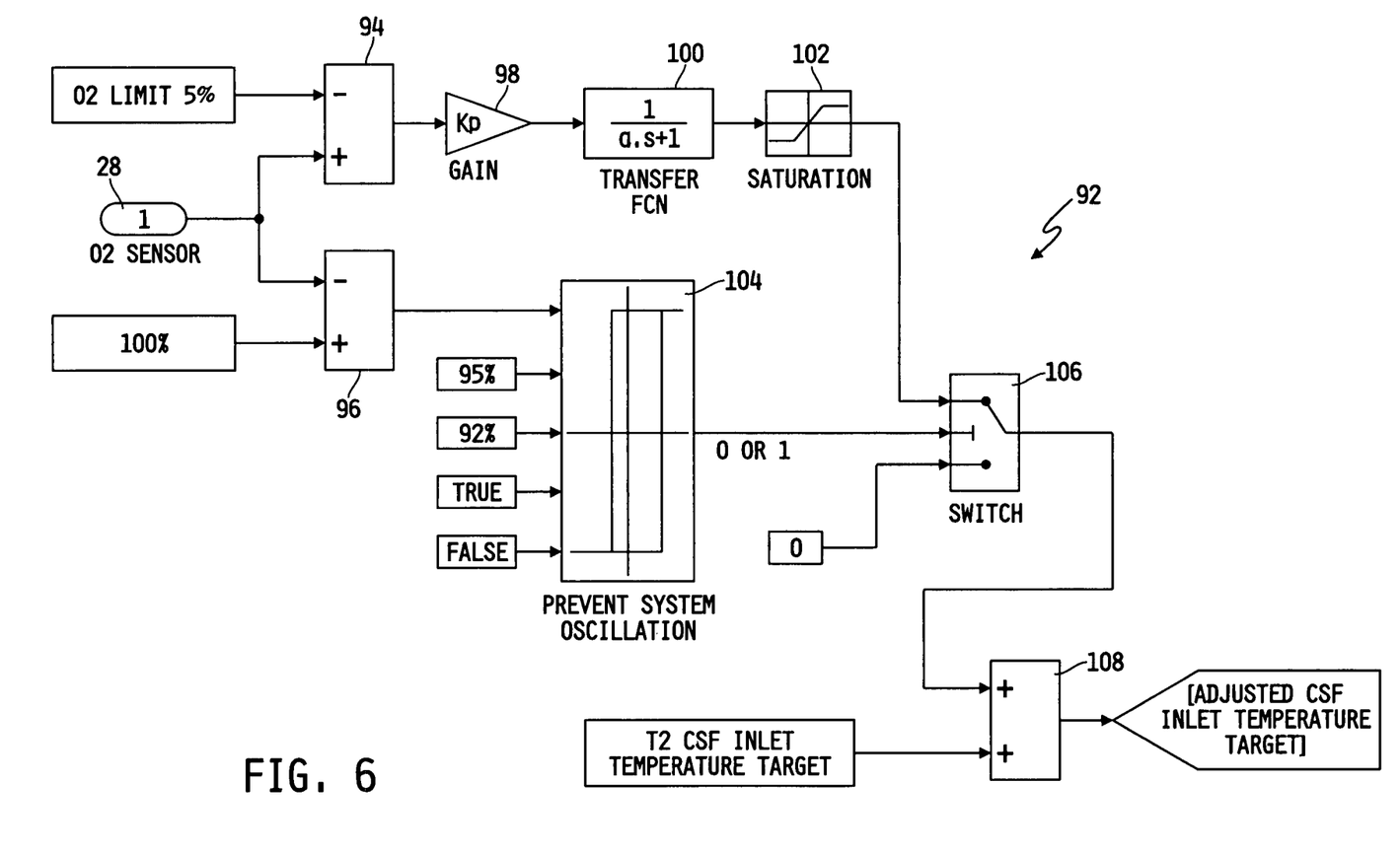

FIG. 6 depicts yet another system for controlling the inlet temperature of CSF 16. As shown, system 92 generally includes comparators 94, 96, amplifier 98, filter 100, limiter 102, hysteresis block 104, switch 106, and summer 108. The negative input to comparator 94 is a target oxygen percentage which may be stored in memory 37. As is well known in the art, a minimum percentage of oxygen is required in CSF 16 to effectively burn soot during regeneration. In this example, the target oxygen percentage is set at 5%, which corresponds approximately to the minimum percentage of oxygen required for effective regeneration. Comparator 94 also receives the $O2_{IN}$ signal as a positive input from oxygen sensor 28. The difference between the target oxygen percentage and the actual oxygen percentage as represented by the $O2_{IN}$ signal is output by comparator 94 to amplifier 98. Amplifier 98 is configured such that its gain effectively converts the difference signal from comparator 94 into a temperature signal offset corresponding to the target inlet temperature of CSF 16. This temperature signal offset is passed through filter 100 which filters out high frequency noises. The output of filter 100 is provided to limiter 102 which ensures that the temperature signal offset does not exceed certain predetermined limits that may result in faulty operation and/or damage to CSF 16. The output of limiter 102, a target temperature adjustment signal, is provided as one input to switch 106.

The output of switch 106 is controlled by hysteresis block 104. More specifically, comparator 96 receives as its negative input the $O2_{IN}$ signal from oxygen sensor 28, and as its positive input a value of 100%, which is stored in memory 37. Comparator 96 outputs the difference between the 100% value and the actual oxygen percentage as represented by the $O2_{IN}$ signal. This value is provided as an input to hysteresis block 104, which is configured to prevent oscillation of system 92 by providing an enable signal. Whenever the $O2_{IN}$ signal represents an oxygen percentage in CSF 16 that is below a specified percentage (e.g., 5%), thereby resulting in an output from comparator 96 above 95%, hysteresis block 104 enables switch 106 and permits the target temperature adjustment signal to be used to modify the target inlet temperature of CSF 16 in the manner described below. When the output of comparator 96 is below 92% (indicating an oxygen percentage larger than 8% in CSF 16), hysteresis block 104 does not enable switch 106, thereby preventing the target temperature adjustment signal generated by the upper portion of system 92 from being used to modify the target inlet temperature of CSF 16.

For example, if the $O2_{IN}$ signal represents an oxygen percentage in CSF 16 of 4%, then the output of comparator 96 is 96%. As the 96% value exceeds 95% (i.e., the oxygen percentage in CSF 16 is lower than the minimum percentage required for effective regeneration), hysteresis block 104 enables switch 106. When enabled, switch 106 outputs the target temperature adjustment signal to summer 108. The other input of summer 108 is the target inlet temperature of CSF 16 as derived from curve 82 described above with reference to FIG. 5. In situations where the $O2_{IN}$ signal is below the 5% limit, the target temperature adjustment signal is negative. As such, when the negative target temperature adjustment signal is added to the target inlet temperature of CSF 16 at summer 108, the adjusted target inlet temperature of CSF 16 at the output of summer 108 is lower than the original target inlet temperature of CSF 16. This adjusted target inlet temperature of CSF 16 is used instead of the target inlet temperature of CSF 16 derived from curve 82 as the input to the system of FIG. 5. The lower adjusted target inlet temperature of CSF 16 will result, through the operation of the system of FIG. 5 as described above, in less fuel injected into engine 12 for effective regeneration of CSF 16. In addition to the fuel savings resulting from the lower adjusted target temperature of CSF 16, the decreased amount of injected fuel results in a corresponding increase in the actual oxygen percentage as represented by the $O2_{IN}$ signal.

As should be apparent from the foregoing, if the $O2_{IN}$ signal represents an increase of oxygen percentage in CSF 16 to greater than 8%, then the adjusted target inlet temperature of CSF 16 will be set back to the original target temperature. For example, if the $O2_{IN}$ signal represents an oxygen percentage in CSF 16 of 9%, then hysteresis block 104 disables switch 106. In this example, the adjusted target temperature offset amount becomes zero. The final adjusted target temperature is equal to the original target temperature. In this case, fuel derate becomes active, and the system returns to normal regeneration.

Figure 7:
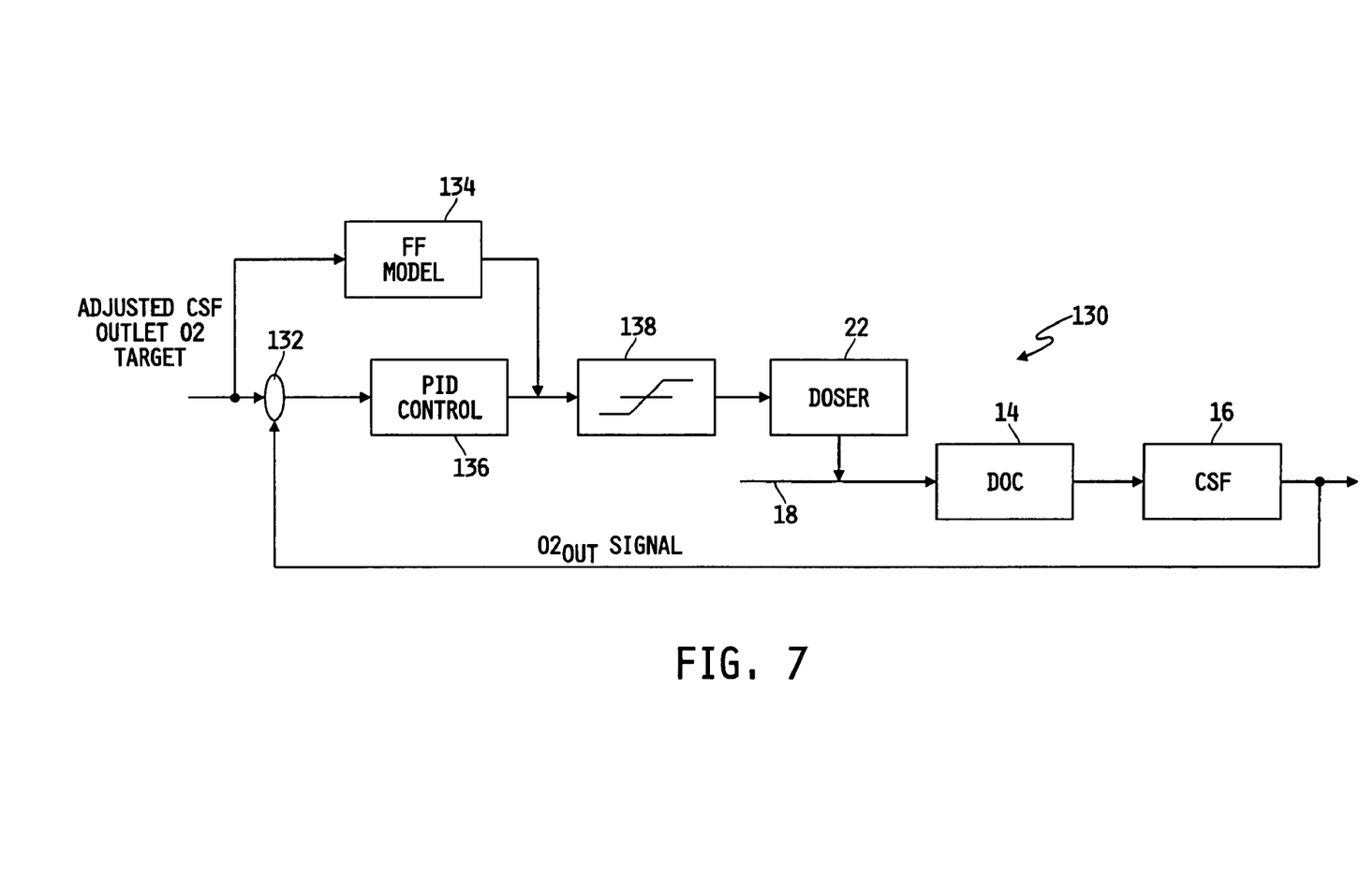
Figure 8:
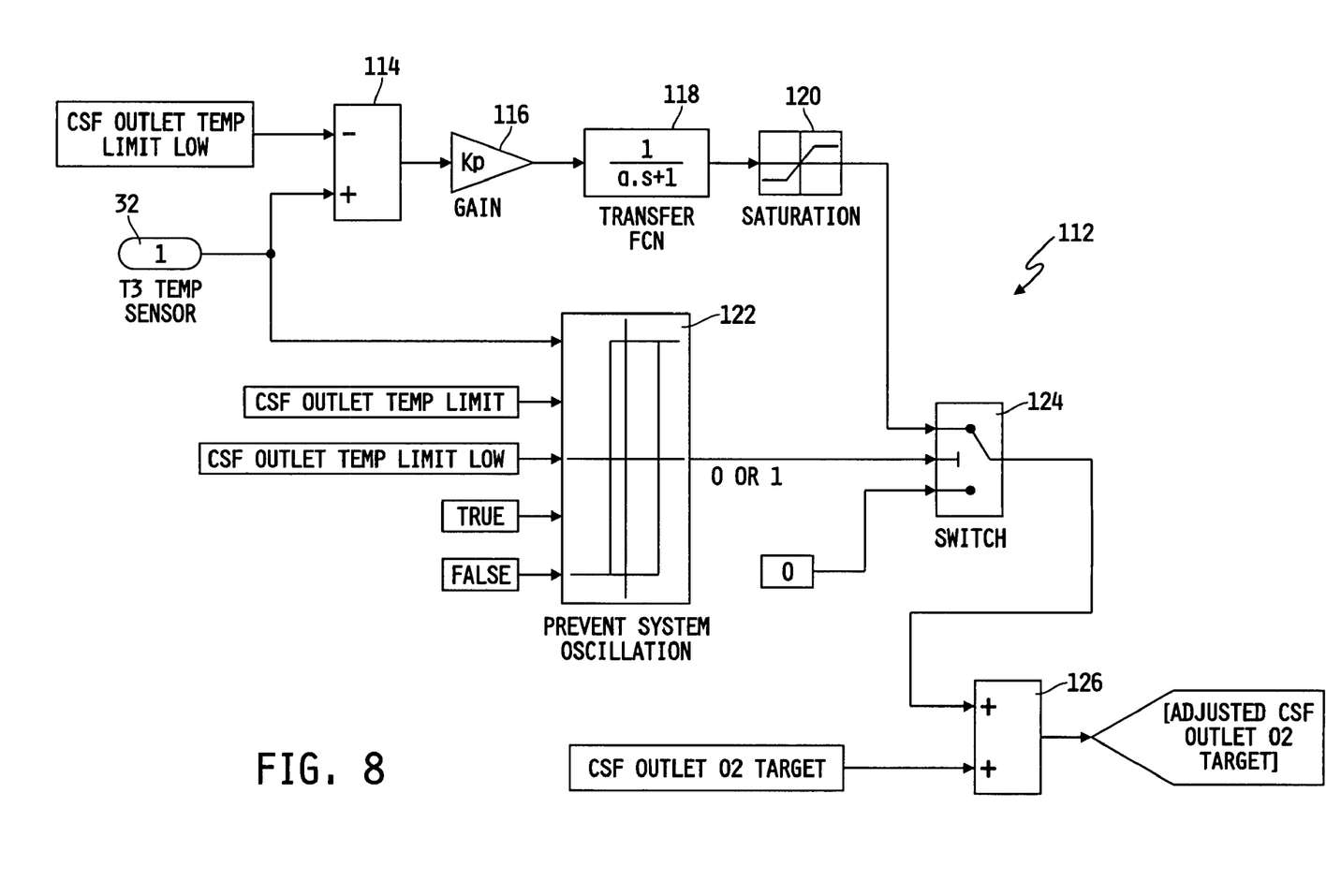

FIGS. 7 and 8 depict an alternate embodiment of the invention based on monitoring the oxygen percentage of the exhaust at the output of CSF 16. In this embodiment, oxygen sensor 34 (FIG. 1) is used to provide an $O2_{OUT}$ signal to microprocessor 33 representing the percentage of oxygen in the exhaust flowing through conduit 30. By controlling the $O2_{OUT}$ signal to approximately the stoichiometric condition, the need to monitor and control the inlet temperature of CSF 16 is eliminated. Thus, temperature sensor 26 is unnecessary. Stoichiometric combustion is the ideal, theoretical combustion process during which a fuel is burned completely, wherein the $O2_{OUT}$ signal would represent zero percent oxygen at the output of CSF 16. By controlling toward stoichiometric combustion within CSF 16 using oxygen sensor 34, the system of FIGS. 7 and 8 will achieve maximum inlet temperature of CSF 16 for soot regeneration with sufficient oxygen to burn in CSF 16.

Referring first to FIG. 8, system 112 generally includes a comparator 114, an amplifier 116, a filter 118, a limiter 120, a hysteresis block 122, a switch 124, and a summer 126. An outlet temperature limit for CSF 16 is stored in memory 37 and provided to the negative input of comparator 114. This temperature represents the maximum temperature for soot regeneration without resulting in thermal damage to CSF 16. The actual outlet temperature of CSF 16 as measured by temperature sensor 32 (FIG. 1) is provided to the positive input of comparator 114 as the T3 signal. The difference between the T3 signal and the outlet temperature limit for CSF 16 is provided to amplifier 116, which is configured to convert the difference signal to a signal representing an adjusted oxygen percentage offset corresponding to a target oxygen percentage at the outlet of CSF 16. This adjusted oxygen percentage offset is passed through filter 118 to remove noise. Limiter 120 sets the maximum oxygen percentage adjustment allowed. Finally, a positive oxygen percentage adjustment signal is provided to switch 124.

The operation of switch 124 is controlled by hysteresis block 122 in a manner that is similar to that described above with reference to hysteresis block 104 of FIG. 6. The T3 signal is provided to hysteresis block 122 and compared to a higher limit stored in memory 37. When the T3 signal indicates an outlet temperature of CSF 16 that is above the outlet temperature limit, the output of hysteresis block 122 is true or high, which enables switch 124. After switch 124 is enabled, when the T3 signal indicates an outlet temperature of CSF 16 that is below the lower limit, the output of hysteresis block 122 is false or low, which does not enable switch 124. When switch 124 is enabled, the oxygen percentage adjustment signal is passed through switch 124 to summer 126, where it is added to a target oxygen percentage for the outlet of CSF 16 (e.g., 2%). The combined signal is provided by summer 126 as an adjusted oxygen percentage target for the outlet of CSF 16.

The adjusted oxygen percentage target is used by microprocessor 33 as the input to control system 130 of FIG. 7. System 130 generally includes a comparator 132, a FF model 134, a PID controller 136, and a limiter 138. As shown, the adjusted oxygen percentage target is provided to comparator 132 and FF model 134. FF model 134 calculates the amount of fuel necessary to achieve the target oxygen percentage based on the following formula:

$$\dot{m}_{doser} = \sqrt{\frac{\dot{m}_a}{f(O_2)}} - \dot{m}_{fengine}$$

where $\dot{m}_{doser}$ is the calculated fueling command signal for doser 22; $\dot{m}_a$ is the fresh air flow; $f(O_2)$ is the air/fuel ratio measured by oxygen sensor 34; and $\dot{m}_{fengine}$ is the fuel rate from engine 12. PID controller 136 modulates the signal from comparator 132, which represents the difference between the adjusted oxygen percentage target for the outlet of CSF 16 and the actual oxygen percentage as represented by the $O2_{OUT}$ signal from oxygen sensor 34. Next, the output of PID controller 136 is added to the output of FF model 134, and compared to predetermined limits stored in memory 37 at limiter 138 in the manner described above with reference to limiter 90 of FIG. 5. The fuel injection command signal at the output of limiter 138 is provided to fuel doser 22 which injects a corresponding amount of fuel into conduit 18 at the input of DOC 14. Combustion of the additional fuel raises the temperature of the exhaust at the output of DOC 14, and therefore at the input of CSF 16. In this manner, the fuel injected into system 10 is controlled to result in a target oxygen percentage at the output of CSF 16 which is selected to correspond to efficient regeneration of soot.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A system for controlling soot regeneration in a catalyst soot filter ("CSF"), including:
    a engine control module ("ECM") configured to determine, based on a current exhaust flow value, a target light off temperature of a diesel oxidation catalyst ("DOC") having an inlet that receives exhaust gas and an outlet that provides exhaust gas to an inlet of the CSF; and
    a first temperature sensor configured to provide a first temperature signal representing a temperature of the exhaust gas at the inlet of the DOC;
    the ECM further including a first comparator that outputs a first difference signal representing the difference between the target light off temperature and the first temperature signal, and a first feed-forward model that calculates a first amount of post injection fuel needed to cause the first temperature signal to equal the target light off temperature, the ECM outputting a first command signal corresponding to the calculated first amount of fuel to a fuel pump that injects a first amount of fuel into a cylinder of the engine, combustion of the first amount of fuel thereby causing the first temperature signal to approach the target light off temperature.

2. The system of claim 1 further including a first PID controller that generates, based on the first difference signal, a first error signal that is added to the calculated first amount of fuel to produce a first combined fuel injection value, the first command signal corresponding to the first combined fuel injection value.

3. The system of claim 1 wherein the ECM further includes a first limiter that limits the first combined fuel injection value to a maximum value if the first combined fuel injection value exceeds the maximum value.

4. The system of claim 2 further including a second temperature sensor configured to provide a second temperature signal representing a temperature of the exhaust gas at the inlet of the CSF, and a pressure sensor configured to provide a pressure signal representing a pressure differential across the CSF.

5. The system of claim 4 wherein the ECM further includes a memory includes CSF inlet temperature data representing a relationship between exhaust flow values, target CSF inlet temperatures for regeneration of soot, and pressure differentials across the CSF, the ECM being configured to use the CSF inlet temperature data determine a target CSF inlet temperature based on the current exhaust flow value and the pressure signal.

6. The system of claim 5 wherein the ECM further includes a second comparator that outputs a second difference signal representing the difference between the target CSF inlet temperature and the second temperature signal, a second feed-forward model that calculates a second amount of post injection fuel needed to cause the second temperature signal to equal the target CSF inlet temperature, a second PID controller that generates, based on the second difference signal, a second error signal that is added to the second amount of post injection fuel to produce a second combined fuel injection value, the ECM outputting a second command signal corresponding to the second combined fuel injection value to cause injection of a second amount of fuel for combustion in the DOC to cause the second temperature signal to approach the target CSF inlet temperature.

7. The system of claim 6 wherein the ECM outputs the second command signal to the fuel pump, which injects the second amount of fuel into the cylinder.

8. The system of claim 6 wherein the ECM outputs the second command signal to a fuel doser, which injects the second amount of fuel into the inlet of the DOC.

9. The system of claim 5 further including an oxygen sensor configured to provide an oxygen signal representing a percentage of oxygen in the exhaust gas at the inlet of the CSF, the ECM further including a second comparator that outputs a second difference signal representing a difference between the oxygen signal and a target oxygen percentage, a third comparator that outputs a third difference signal representing a difference between the oxygen signal and maximum oxygen percentage, an amplifier configured to convert the second difference signal into a temperature offset signal, a switch having a temperature adjustment signal based on the temperature offset signal as an input, the switch being configured to output, when enabled, the temperature adjustment signal to a summer that combines the temperature adjustment signal with the target CSF inlet temperature and outputs an adjusted target CSF inlet temperature.

10. The system of claim 9 wherein the ECM further includes a hysteresis block having the third difference signal as an input, the hysteresis block being configured to enable the switch when the third difference signal exceeds a predefined threshold.

11. The system of claim 9 wherein the ECM further includes a limiter coupled between the amplifier and the switch to prevent the temperature offset signal from exceeding a predefined limit, the limiter outputting the temperature adjustment signal.

12. The system of claim 9 wherein the FOM further includes a fourth comparator that outputs a fourth difference signal representing the difference between the adjusted target CSF inlet temperature and the second temperature signal, a second feed-forward model that calculates a second amount of post injection fuel needed to cause the second temperature signal to equal the adjusted target CSF inlet temperature, a second PID controller that generates, based on the fourth difference signal, a second error signal that is added to the second amount of post injection fuel to produce a second combined fuel injection value, the ECM outputting a second command signal corresponding to the second combined fuel injection value to cause injection of a second amount of fuel for combustion in the DOC to cause the second temperature signal to approach the adjusted target CSF inlet temperature.

13. The system of claim 1 wherein the ECM further includes a memory including light off temperature data representing a relationship between exhaust flow values and target light off temperatures of the DOC, the ECM determining the target light off temperature by accessing the light off temperature data.

14. A system for controlling soot regeneration in a catalyst soot filter ("CSF") including:
an oxygen sensor coupled to an outlet of the CSF and configured to provide an oxygen signal representing a percentage of oxygen in exhaust gas in the CSF outlet;
a temperature sensor coupled to the CSF outlet and configured to provide a temperature signal representing a temperature of the exhaust gas in the CSF outlet;
an amplifier configured to convert a difference between a CSF outlet temperature limit and the temperature signal into an oxygen percentage offset signal;
a switch which, when enabled, passes the oxygen percentage offset signal to a summer which adds the oxygen percentage offset signal to a target oxygen percentage for the CSF outlet and outputs an adjusted target CSF outlet oxygen percentage;
a feed-forward model configured to calculate an amount of post injection fuel needed to cause the oxygen signal to equal the adjusted target CSF outlet oxygen percentage; and
a microprocessor that outputs a command signal corresponding to the calculated amount of post injection fuel to a fuel doser that injects a first amount of fuel into an inlet to a diesel oxidation catalyst ("DOC") having an outlet coupled to an inlet of the CSF.

15. The system of claim 14 further including a first comparator configured to output a difference signal representing the difference between the CSF outlet temperature limit and the temperature signal.

16. The system of claim 15 further including a second comparator configured to output a second difference signal representing a difference between the adjusted target CSF outlet oxygen percentage and the oxygen signal to a PID controller that generates, based on the second difference signal, an error signal that is added to the calculated amount of post injection fuel to produce a combined fuel injection value, the command signal corresponding to the combined fuel value.

17. The system of claim 14 wherein the feed-forward model calculates the amount of post injection fuel according to the equation $$\dot{m}_{doser} = \sqrt{\frac{\dot{m}_a}{f(O_2)}} - \dot{m}_{fengine}$$

where $\dot{m}_{doser}$ is a calculated fueling command signal for the fuel doser, $\dot{m}_a$ is a value representing fresh airflow, $f(O_2)$ is an air/fuel ratio based on the oxygen signal, and $\dot{m}_{fengine}$ is a rate of fuel provided to an engine.

18. The system of claim 14 further including a hysteresis block having the temperature signal as an input, the hysteresis block being configured to enable the switch when the temperature signal exceeds a predefined threshold.

19. A method for controlling soot regeneration in a catalyst soot filter ("CSF"), including the steps of:
measuring a first temperature of exhaust gas at an inlet to a diesel oxidation catalyst ("DOC") having an outlet coupled to an inlet of the CSF;
determining a target light off temperature for the DOC based on a measurement of exhaust flow through the exhaust system;
injecting a first fuel amount into a cylinder of an engine to cause the first measured temperature to approach the target light off temperature, the first fuel amount being derived from a difference between the first measured temperature and the target light off temperature;
measuring a second temperature of exhaust gas at the inlet of the CSF;
measuring a pressure across the CSF;
determining a target CSF inlet temperature for regeneration based on the exhaust flow measurement and the measured pressure; and injecting a second fuel amount for combustion in the DOC to cause the second measured temperature to approach the target CSF inlet temperature, the second fuel amount being derived from a difference between the second measured temperature and the target CSF inlet temperature.

20. The method of claim 19 wherein the second fuel amount is injected into the cylinder.

21. The method of claim 20 wherein the second fuel amount is injected by a fuel doser into the inlet of the DOC.

22. The method of claim 19 further including the steps of measuring a percentage of oxygen in the exhaust gas at the inlet of the CSF and calculating an adjustment to the target CSF inlet temperature based on the measured oxygen percentage.

23. The method of claim 22 wherein the calculating step includes the steps of determining a difference between the measured oxygen percentage and a target oxygen percentage, converting the difference into a temperature adjustment signal, and combining the temperature adjustment signal with the target CSF inlet temperature to produce the adjustment to the target CSF inlet temperature.

24. A method of controlling soot regeneration in a catalyst soot filter ("CSF"), including the steps of:
    measuring an oxygen percentage of exhaust gas at an outlet of the CSF;
    measuring a temperature of the exhaust gas at the outlet of the CSF;
    determining a first difference between the measured temperature and a temperature limit;
    converting the first difference into an oxygen percentage offset value;
    combining the oxygen percentage offset value with a target oxygen percentage to produce an adjusted target CSF outlet oxygen percentage;
    determining a second difference between the adjusted target CSF outlet oxygen percentage and the measured oxygen percentage;
    calculating an amount of post injection fuel needed to cause the measured oxygen percentage to equal the adjusted target CSF outlet oxygen percentage; and
    injecting an amount of fuel corresponding to the calculated amount of post injection fuel into an inlet of a diesel oxidation catalyst having an outlet coupled to an inlet of the CSF.

25. The method of claim 24 further including the step of generating, based on the second difference, an error signal that is added to the calculated amount of post injection fuel to produce a combined fuel injection value, the injected amount of fuel being based on the combined fuel injection value.

26. The method of claim 25 wherein the calculating step is performed according to the equation $$\dot{m}_{doser} = \sqrt{\frac{\dot{m}_a}{f(O_2)}} - \dot{m}_{fengine}$$

where $\dot{m}_{doser}$ is a calculated fueling command signal for a fuel doser, $\dot{m}_a$ is a value representing fresh air flow, $f(O_2)$ is an air/fuel ratio based on the oxygen signal, and $\dot{m}_{fengine}$ is a rate of fuel provided to an engine.

27. The method of claim 24 wherein the injecting step is performed only when the measured temperature exceeds a predefined threshold.

* * * * *